United States Patent [19]

Lin

[11] Patent Number: 5,768,663

[45] Date of Patent: Jun. 16, 1998

[54] LIGHT SOURCE ARRANGEMENT OF A SCANNER

[76] Inventor: Bob Lin, No. 9 Lane 102, San-Min Rd., Taipei, Taiwan

[21] Appl. No.: 790,616

[22] Filed: Jan. 29, 1997

[51] Int. Cl.$^6$ .................................................. G03G 15/04
[52] U.S. Cl. ............................ 399/220; 358/509; 362/217
[58] Field of Search ........................ 399/220; 362/217; 358/480, 509

[56] References Cited

U.S. PATENT DOCUMENTS

| | | | |
|---|---|---|---|
| 3,498,708 | 3/1970 | Howard | 399/220 |
| 3,779,640 | 12/1973 | Kidd | 399/220 |
| 4,549,251 | 10/1985 | Chapman et al. | 362/217 X |
| 4,767,193 | 8/1988 | Ota et al. | 362/217 X |
| 5,479,328 | 12/1995 | Lee et al. | 362/217 X |

*Primary Examiner*—Fred L. Braun
*Attorney, Agent, or Firm*—Bacon & Thomas

[57] ABSTRACT

A light source mounted in a scanner adjacent to a platform thereof, including a lamp tube, the lamp tube having a straight middle section across the width of the scanner area within the platform, and two curved end sections respectively extended from both ends of the straight middle section at a contained angle, permitting light from the curved end sections and light from the straight middle section to overlap.

6 Claims, 3 Drawing Sheets

LIGHT SOURCE ARRANGEMENT OF A SCANNER

BACKGROUND OF THE INVENTION

The present invention relates to a light source for a scanner, and more particularly to such a light source which provides a uniform intensity of light to the whole scanning area of the scanner.

The technique of using a photoelectric element to receive light and to convert it into digitized image data has been well known, and intensively used in optical scanners, fax machines, etc. U.S. Pat. No. 5,115,374 teaches the installation of a scanner in a computer. Conventional scanners commonly use a straight lamp tube as a light source for providing light to the document to be scanned. However, a lamp tube cannot provide a uniform intensity of light to the whole scanning area, because the intensity of light at both ends of a straight lamp tube is relatively weaker than that at the middle part. This drawback affects the scanning quality, and may lead to an image distortion.

SUMMARY OF THE INVENTION

The present invention has been accomplished to provide a light source for a scanner which eliminates the aforesaid problems. According to one aspect of the present invention, the light source is a lamp tube having a straight middle section across the width of the scanner area within the platform, and two curved end sections respectively extended from both ends of the straight middle section at a contained angle, permitting light from the curved end sections and light from the straight middle section to overlap. Therefore, the intensity of light at both lateral sides of the scanning area is compensated. According to another aspect of the present invention, the light source is obtained by bending a straight lamp tube into the desired shape, therefore the fabrication procedure is simple.

DETAILED DESCRIPTION OF THE PREFERRED EMBODIMENT

Figure 1:
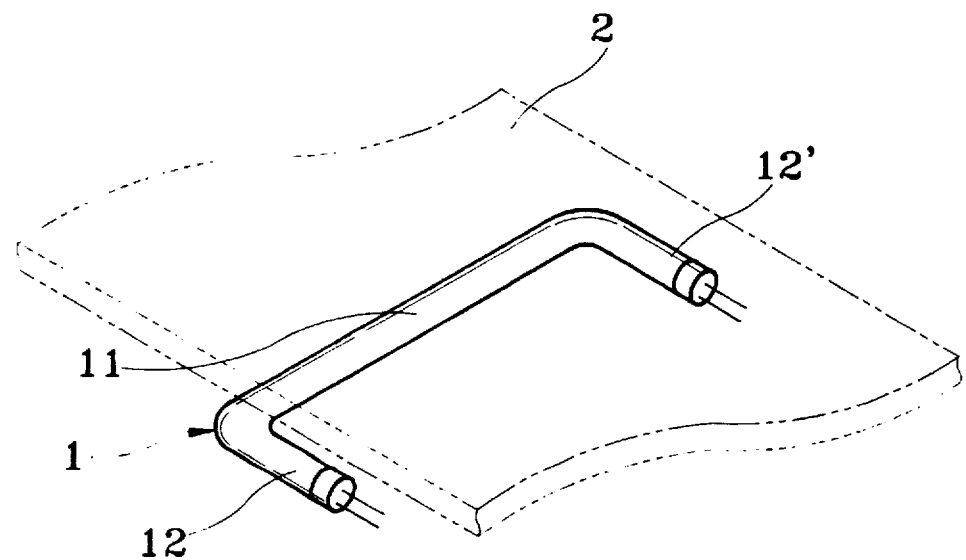
FIG. 1 is an elevational view of a lamp tube according to a first embodiment of the present invention.
Figure 2:
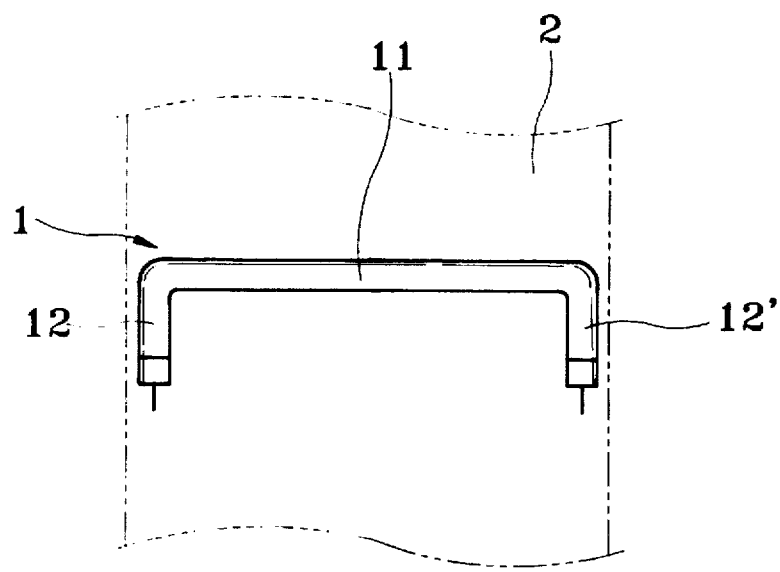
FIG. 2 is a top plain view of FIG. 1.

Referring to FIGS. 1 and 2, the light source, referenced by 1, is a lamp tube. The lamp tube 1 comprises a straight middle section 11 disposed in a transverse direction cross over the document to be scanned, and two curved end sections 12 and 12' respectively extended from two opposite ends of the straight middle section 11 at a contained angle. The curved end sections 12 and 12' are so arranged that light from the curved end sections 12 and 12' can be overlapped with light from the straight middle section 11 onto the document to be scanned.

Figure 5:
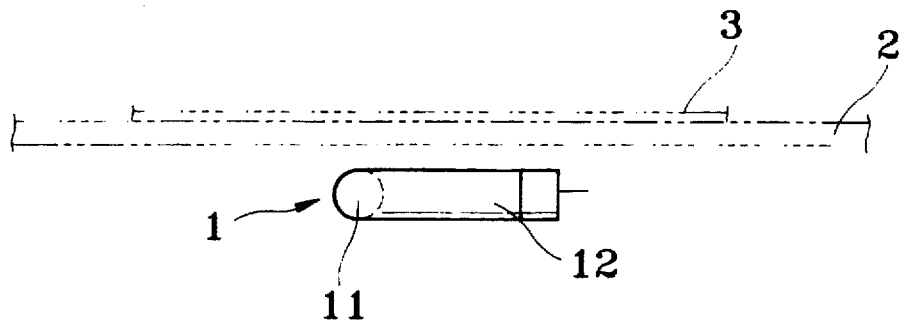
FIG. 5 is side view of the present invention, showing the lamp tube installed in a horizontal position beneath the platform.
Figure 6:
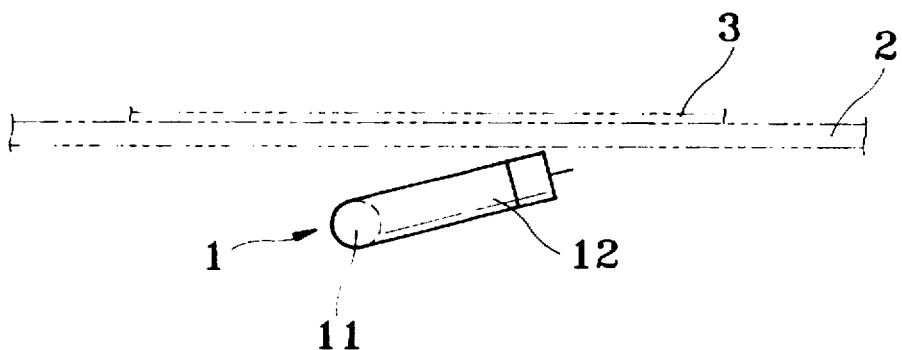
FIG. 6 is another side view of the present invention, showing the lamp tube mounted in a tilted position beneath the platform.

The scanner which is equipped with the aforesaid lamp tube 1 comprises a platform 2 adapted for carrying the document 3 (see FIGS. 5 and 6). The document 3 can be a sheet of document or a picture. The platform 2 is normally a transparent glass plate. The lamp tube 1 is disposed adjacent to one side for example the bottom side of the platform 2, and the document 3 is placed on the top side of the platform 2. Light from the lamp tube 1 is reflected by the document 3 onto the photoelectric element (for example: a charge coupled device or a contact image sensor), therefore the image of the document 3 is received by the photoelectric element and converted by it into digitized picture data. Because the straight middle section 11 covers the width of the document, and because light from the curved end sections 12 and 12' and light from the straight middle sections are overlapped, the intensity of light at both lateral sides of the document is reinforced, and a uniform light intensity is given to the whole scanning area.

Figure 3:
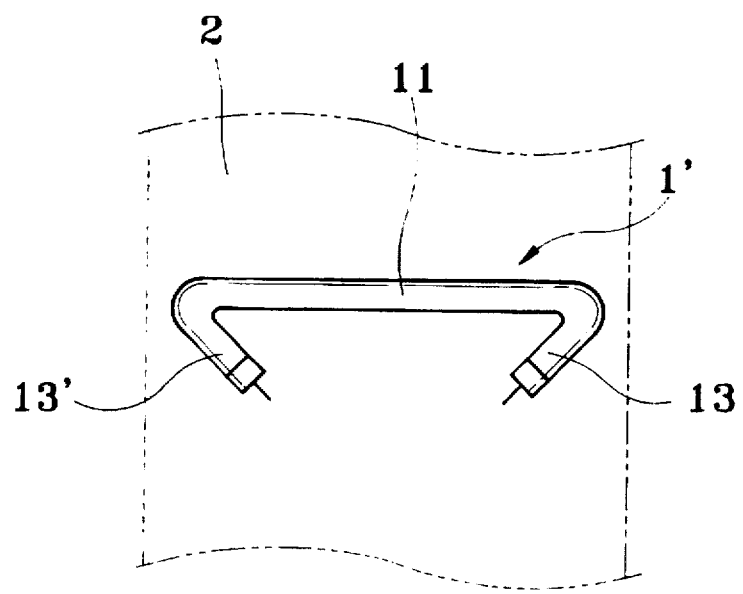
FIG. 3 is a top plain view of a lamp tube according to a second embodiment of the present invention.
Figure 4:
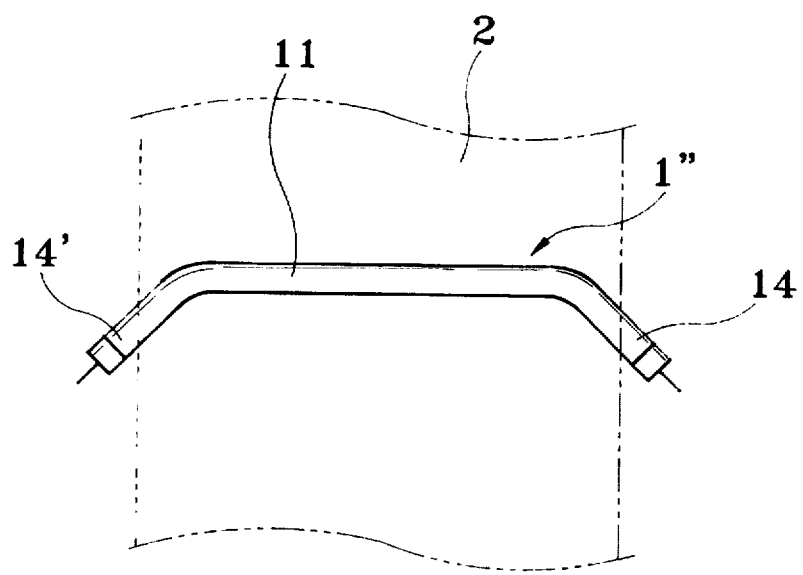
FIG. 4 is a top plain view of a lamp tube according to a third embodiment of the present invention.

FIG. 3 shows an alternate form of the present invention. According to this alternate form, the contained angle between the straight middle section 11 of the lamp tube 1' and each curved end section 13, 13' is smaller than 90° angle. FIG. 4 shows another alternate form of the present invention. According to this alternate form, the contained angle between the straight middle section 11 of the lamp tube 1" and each curved end section 14, 14' is greater than 90° angle.

The lamp tube 1 can be so arranged that the straight middle section 11 and the curved end sections 12 and 12' (the curved end section 12' is not shown) are disposed in parallel to and equally spaced from the platform 2, as shown in FIG. 5. Alternatively, the lamp tube 1 can be so arranged that the space between the curved end sections 12 and 12' (the curved end section 12' is not shown) and the platform 2 is shorter than the distance between the straight middle section 11 and the platform 2. By changing the tilt angle of the lamp tube 1 to adjust the distance between the curved end sections 12 and 12' and the platform 2, the degree of compensation of the light intensity at both lateral sides can be relatively adjusted to achieve a high scanning quality.

I claim:

1. A light source in a scanner having a substantially planar platform with opposite lateral side edges, the light source comprising a lamp tube having a straight middle section and opposite end sections connected to the straight middle section by curved portions such that the end sections form angles of less than 180° with the straight middle section, the curved portion being located between the opposite lateral side edges of the platform whereby light from the end sections overlaps light from the middle section to produce uniform light on the platform.

2. The light source of claim 1 wherein each of the angles between the middle section and the opposite end sections is substantially 90°.

3. The light source of claim 1 wherein each of the angles between the middle section and the opposite end sections is greater than 90°.

4. The light source of claim 1 wherein each of the angles between the middle section and the opposite end sections is less than 90°.

5. The light source of claim 1 wherein the end sections are substantially parallel to the platform.

6. The light source of claim 1 wherein the end sections extend from the middle section towards the platform.

* * * * *